(12) United States Patent
Lee et al.

(10) Patent No.: US 12,370,632 B2
(45) Date of Patent: Jul. 29, 2025

(54) METAL PARTICLE FOR ADHESIVE PASTE, METHOD OF PREPARING THE SAME, SOLDER PASTE INCLUDING THE SAME, COMPOSITE BONDING STRUCTURE FORMED THEREFROM, AND SEMICONDUCTOR DEVICE INCLUDING THE COMPOSITE BONDING STRUCTURE

(71) Applicant: Samsung Electronics Co., Ltd., Suwon-si (KR)

(72) Inventors: Junghoon Lee, Seongnam-si (KR); Kunmo Chu, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 258 days.

(21) Appl. No.: 17/965,197

(22) Filed: Oct. 13, 2022

(65) Prior Publication Data
US 2023/0117153 A1 Apr. 20, 2023

(30) Foreign Application Priority Data
Oct. 15, 2021 (KR) .................. 10-2021-0137839

(51) Int. Cl.
*B23K 35/02* (2006.01)
*B22F 1/17* (2022.01)
(Continued)

(52) U.S. Cl.
CPC ............ *B23K 35/025* (2013.01); *B22F 1/17* (2022.01); *B23K 35/262* (2013.01);
(Continued)

(58) Field of Classification Search
None
See application file for complete search history.

(56) References Cited

U.S. PATENT DOCUMENTS

| 5,160,373 A | 11/1992 | Senda et al. |
| 6,322,685 B1 | 11/2001 | Kang et al. |
| (Continued) | | |

FOREIGN PATENT DOCUMENTS

| CN | 110459757 A | 11/2019 |
| JP | 2018/046010 A | 3/2018 |
| (Continued) | | |

OTHER PUBLICATIONS

Ashutosh Sharma et al., 'Influence of $La_2O_3$ nanoparticle additions onmicrostructure, wetting, and tensile characteristics of Sn—Ag—Cu alloy' Materials and Design, vol. 87, 2015, pp. 370-379.
(Continued)

*Primary Examiner* — Daniel J. Schleis
(74) *Attorney, Agent, or Firm* — HARNESS, DICKEY & PIERCE, P.L.C.

(57) ABSTRACT

Provided is a metal particle for adhesive paste. The metal particle may include a core including at least one metal; and a shell on at least one surface of the core and including at least one metal and nanoparticles. The metal particle may be a transient liquid phase particle and the at least one metal of the core may have a higher melting point than a melting point of the at least one metal of the shell. In addition, provided are a method of preparing the metal particle for adhesive paste, a composite bonding structure formed from the metal particle for adhesive paste, and a semiconductor device including the composite bonding structure.

25 Claims, 12 Drawing Sheets

(51) Int. Cl.
*B23K 35/26* (2006.01)
*B23K 35/36* (2006.01)
*B23K 35/368* (2006.01)
*B23K 101/40* (2006.01)
*B23K 103/16* (2006.01)

(52) U.S. Cl.
CPC ........ *B23K 35/3602* (2013.01); *B23K 35/368* (2013.01); *B23K 2101/40* (2018.08); *B23K 2103/166* (2018.08)

(56) References Cited

U.S. PATENT DOCUMENTS

| | | | |
|---|---|---|---|
| 6,488,888 | B2 | 12/2002 | Murata et al. |
| 6,680,128 | B2 | 1/2004 | Mei |
| 6,867,378 | B2 | 3/2005 | Uchida et al. |
| 6,872,465 | B2 | 3/2005 | Soga et al. |
| 6,906,417 | B2 | 6/2005 | Jiang et al. |
| 6,984,254 | B2 | 1/2006 | Takesue et al. |
| 7,053,491 | B2 | 5/2006 | Martin et al. |
| 7,224,067 | B2 | 5/2007 | Suh |
| 8,303,735 | B2 | 11/2012 | Ueshima |
| 8,920,934 | B2 | 12/2014 | Jiang et al. |
| 9,162,324 | B2 | 10/2015 | Nakano et al. |
| 9,402,313 | B2 | 7/2016 | Sakuyama et al. |
| 9,478,326 | B2 | 10/2016 | Ishida et al. |
| 9,586,281 | B2 | 3/2017 | Aoki et al. |
| 10,249,604 | B2 | 4/2019 | Chu et al. |
| 10,322,471 | B2 | 6/2019 | Choudhury et al. |
| 10,381,319 | B2 | 8/2019 | Nishino et al. |
| 2007/0131737 | A1 | 6/2007 | Renavikar et al. |
| 2014/0299231 | A1 | 10/2014 | Chu et al. |
| 2021/0213530 | A1* | 7/2021 | Kuboyama ............... B22F 1/17 |
| 2022/0077100 | A1 | 3/2022 | Chu et al. |
| 2022/0093549 | A1* | 3/2022 | Chu ..................... B23K 35/262 |
| 2022/0235248 | A1 | 3/2022 | Chu et al. |

FOREIGN PATENT DOCUMENTS

| | | |
|---|---|---|
| KR | 2015/0084329 A | 7/2015 |
| KR | 2022/0032918 A | 3/2022 |
| KR | 2022/0040307 A | 3/2022 |

OTHER PUBLICATIONS

N.S. Qu et al., 'Fabrication of Ni—$CeO_2$ nanocomposite by electrodeposition' Scripta Materialia, vol. 54, 2006, pp. 1421-1425.

* cited by examiner

METAL PARTICLE FOR ADHESIVE PASTE, METHOD OF PREPARING THE SAME, SOLDER PASTE INCLUDING THE SAME, COMPOSITE BONDING STRUCTURE FORMED THEREFROM, AND SEMICONDUCTOR DEVICE INCLUDING THE COMPOSITE BONDING STRUCTURE

CROSS-REFERENCE TO RELATED APPLICATION

This application is based on and claims priority under 35 U.S.C. § 119 to Korean Patent Application No. 10-2021-0137839, filed on Oct. 15, 2021, in the Korean Intellectual Property Office, the disclosure of which is incorporated by reference herein in its entirety.

BACKGROUND

1. Field

The present disclosure relates to a metal particle for adhesive paste, a method of preparing the same, a solder paste including the same, a composite bonding structure formed therefrom, and/or a semiconductor device including the composite bonding structure.

2. Description of the Related Art

In recent years, in line with the trend of smaller electronic devices with higher performance, a large number of semiconductor devices are mounted on a single board with a high level of integration. Here, a material enabling mounting at a low temperature of 200° C. or less is needed in order to reduce defects and performance degradation in semiconductor packages or modules caused by thermal damage.

In addition, there may be a need for a low-temperature mounting material that is applicable to flexible display devices and the like, without causing performance degradation in semiconductor devices.

SUMMARY

One aspect of the present disclosure is to provide a metal particle for adhesive paste having improved mechanical properties while enabling low-temperature mounting, and/or a method of preparing the metal particle for adhesive paste.

Another aspect of the present disclosure provides a solder paste including the metal particle.

Another aspect of the present disclosure provides a composite bonding structure formed from the above-described solder paste.

Another aspect of the present disclosure provides a semiconductor device including the above-described composite bonding structure.

Additional aspects will be set forth in part in the description which follows and, in part, will be apparent from the description, or may be learned by practice of the presented embodiments of the disclosure.

According to an embodiment, a metal particle for adhesive paste may include a core including at least one metal; and a shell on a surface of the core. The shell may include at least one metal and nanoparticles. The metal particle may be a transient liquid phase particle. The at least one metal of the core may have a higher melting point than the melting point of the at least one metal of the shell.

In some embodiments, the nanoparticles may include at least one of metal oxides, metal nitrides, semimetal nitrides, metal carbides, graphene, and carbon nanotubes, and the amount of the nanoparticles with respect to the total weight of the shell may be about 0.01 wt % to about 10 wt %.

In some embodiments, the nanoparticles may have a size of about 1 nm to about 1,000 nm. In addition, the nanoparticles may include at least one of $La_2O_3$, $CeO_2$, SiC, $ZrO_2$, $TiO_2$, $Y_2O_3$, and AlN.

In some embodiments, the nanoparticles may exist on grain boundaries of the at least one metal of the shell.

In some embodiments, the core may have a diameter of about 1 µm to about 100 µm, the shell may have a thickness of about 100 nm to about 20 µm, and the ratio of the thickness of the shell to the thickness of the core in the metal particle may be about 0.05 to about 0.5.

In some embodiments, the core may include one of tin, nickel, copper, gold, silver, germanium, antimony, aluminum, titanium, palladium, chromium, molybdenum, nickel, tungsten, zinc, or a combination thereof. In addition, the shell may include one of tin, indium, gallium, silver, bismuth, zinc, or a combination thereof.

In some embodiments, the at least one metal of the core may include copper, and the at least one metal of the shell may include one of indium, silver, or a combination thereof. The nanoparticles in the shell may include one or more of $CeO_2$, $La_2O_3$, SiC, $ZrO_2$, $TiO_2$, $Y_2O_3$, and AlN.

In some embodiments, an intermetallic compound (IMC) may be between the at least one metal of the core and the at least one metal of the shell.

According to another embodiment, a solder paste may include the above-described metal particle for adhesive paste.

According to another embodiment, a composite bonding structure may include a solder ball; and a heat-treatment product of the above-described solder paste bonded to the solder ball.

In some embodiments, the nanoparticles may be uniformly dispersed in a shell metal matrix of the metal particle.

In some embodiments, the solder ball may include at least one of an Sn—Ag—Cu alloy, an Sn—Bi alloy, an Sn—Bi—Ag alloy, and an Sn—Ag—Cu—Ni alloy. The heat-treatment product of the solder paste may be obtained by subjecting the solder paste to a reflow process at about 150° C. to about 250° C., for example, about 180° C. to about 220° C.

According to another embodiment, a semiconductor device may include: a printed circuit board; a semiconductor chip; and the above-described composite bonding structure between the printed circuit board and the semiconductor chip.

According to an embodiment, a composite structure may include at least one core structure and at least one shell structure. The at least one core structure may include at least one metal. The at least one shell structure may surround the least one core structure. The at least one shell structure may include a metal material and nanoparticles distributed in the metal material. A melting point of the at least one metal may be greater than a melting point of the metal material in the at least one shell structure.

In some embodiments, the at least one core structure may be a plurality of core structures spaced apart from each other. The at least one shell structure may be a plurality of shells. Each corresponding shell may surround a corresponding core structure among the plurality of core structures. The plurality of shells may be connected to each other. The nanoparticles may be distributed in each of the plurality of shells.

In some embodiments, the at least one core structure may be a plurality of core structures spaced apart from each other. The at least one shell structure may be a shell matrix surrounding the plurality of core structures and extending between adjacent core structures among the plurality of core structures.

In some embodiments, the nanoparticles may include at least one of metal oxides, metal nitrides, semimetal nitrides, metal carbides, graphene, and carbon nanotubes, and the nanoparticles may have a size of 1 nm to 1,000 nm.

In some embodiments, the nanoparticles may include at least one of $La_2O_3$, $CeO_2$, $SiC$, $ZrO_2$, $TiO_2$, $Y_2O_3$, and $AlN$. The at least one metal may include one of tin, nickel, copper, gold, silver, germanium, antimony, aluminum, titanium, palladium, chromium, molybdenum, nickel, tungsten, zinc, or a combination thereof. The metal martial may include one of tin, indium, gallium, silver, bismuth, zinc, or a combination thereof.

According to an embodiment, a method of preparing a metal particle for adhesive paste may include preparing a mixture containing a core-forming metal particle or metal precursor, and a shell-forming metal precursor; obtaining a composition by adding nanoparticles to the mixture, and contacting this composition.

In some embodiments, the mixture may be a plating solution, and the contacting of the composition may be performed by electroplating or electroless plating using the composition.

In some embodiments, the nanoparticles are ones that are ultrasonically dispersed.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4A shows an EDS copper mapping analysis result for metal particles for adhesive paste prepared in Example 1;

FIG. 4B shows an indium mapping analysis result of EDS for metal particles for adhesive paste prepared in Example 1;

FIG. 4C shows a cerium mapping analysis result of EDS for metal particles for adhesive paste prepared in Example 1;

DETAILED DESCRIPTION

Figure 1A:
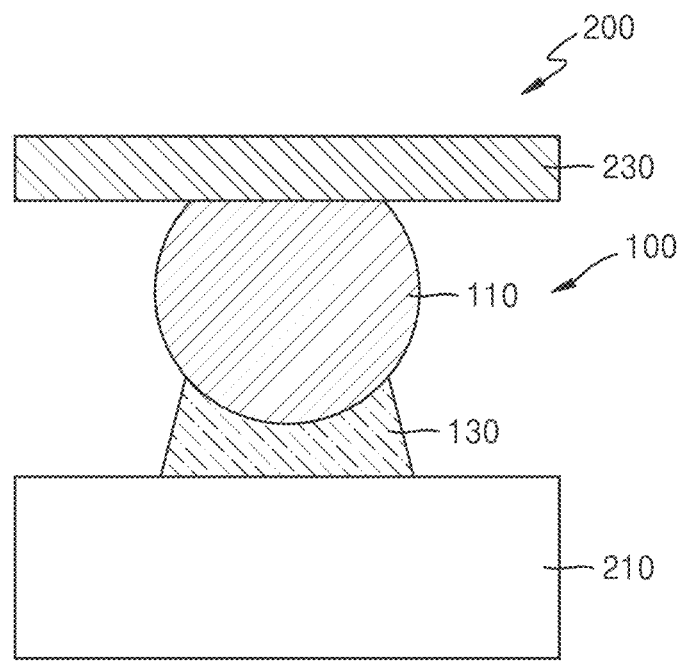
FIG. 1A shows a schematic diagram of a composite bonding structure according to one embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, "at least one of A, B, and C," and similar language (e.g., "at least one selected from the group consisting of A, B, and C") may be construed as A only, B only, C only, or any combination of two or more of A, B, and C, such as, for instance, ABC, AB, BC, and AC.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Hereinbelow, in conjunction with the accompanied drawings, a metal particle for adhesive paste according to one embodiment, a method of preparing the same, a solder paste including the same, and a composite bonding structure formed from the solder paste, and a semiconductor device including the composite bonding structure will be described in greater detail.

Solders used in a semiconductor packaging process are a key material that electrically connects various components to circuit boards.

A solder containing a metal having a high melting point of 200° C. or more, when applied to a highly integrated semiconductor package, tends to give rise to bending or expansion of the circuit board due to a difference in thermal expansion coefficients between the circuit board and a die. Here, there may be shear stress and compressive stress generated on top and bottom of the circuit board, respectively, thus causing cracks at solder joints. This may result in defects in semiconductor packages or semiconductor modules, etc. To resolve such issues, there is need for using a solder containing a high-melting point metal and also, for a low-melting point adhesive paste that reduces and/or minimizes difference in physical properties with respect to the solder while lowering the processing temperature on the board to 200° C. or less.

To this end, the present inventors have developed a metal particle for adhesive paste that may satisfy the above-described requirements.

Metal particles for adhesive paste according to an embodiment include a metal particle containing: a core including at least one metal; and a shell on at least one surface of the core and including at least one metal and nanoparticles, wherein the metal particle is a transient liquid phase (TLP) particle, and the metal material of the core has a higher melting point than the melting point of the metal material of the shell.

In the metal particle, the nanoparticles may be uniformly distributed in the shell without particle coagulation. By using the above-describe metal particle, it is possible to increase the amount of nanoparticles compared to when adding nanoparticles by a common mechanical mixing method, and it is also possible to obtain an adhesive paste having reduced particle coagulation while using an increased amount of nanoparticles.

The nanoparticles are of a material that does not react with a shell-forming metal nor produce an intermetallic compound, and may be, for example, a non-conductor or a conductor.

The nanoparticles are one or more selected from a metal oxide, a metal nitride, a semimetal nitride, a metal carbide, graphene, and a carbon nanotube. The semimetal nitride may be, for example, a silicon nitride.

The nanoparticles may include, for example, at least one from among $La_2O_3$, $CeO_2$, $SiC$, $ZrO_2$, $TiO_2$, $Y_2O_3$, and AlN.

The metal particle according to an embodiment is a nanoparticle-reinforced transient liquid phase (TLP) particle, and as the metal transforms into a liquid state, the grain boundaries may grow. If such grain boundaries are formed in a large amount, the solder paste and the product obtained by heat-treating the solder paste may have diminished mechanical properties.

However, the metal particle according to an embodiment has nanoparticles uniformly distributed in the shell and thus may suppress the formation of crystal grains and grain boundaries. As a result, the grain size of the metal particle is smaller, improving the mechanical properties of the solder paste and the product obtained by heat-treating the solder paste.

According to another embodiment, the nanoparticles may be present on grain boundaries. If the nanoparticles are present on grain boundaries, it is possible to effectively suppress degradation of the mechanical properties of the solder paste and the product obtained by heat-treating the solder paste. To obtain such an effect, the size and amount of the nanoparticles are crucial.

The size of the nanoparticle may be, for example, about 1 nm to 1,000 nm, about 5 nm to about 950 nm, about 10 nm to about 900 nm, about 30 nm to about 700 nm, or about 50 nm to about 500 nm. In addition, the amount of the nanoparticles may be about 0.01 wt % to about 10 wt %, about 0.5 wt % to about 7.5 wt %, or about 1.0 wt % to about 5.0 wt %, with respect to the total amount of the shell in the metal particle.

As used in the present application, particle size refers to an average particle diameter for a particle that is spherical, and for a particle that is non-spherical, such as lamellar and needle-like particles, said term refers to a major axis length of the particle. The particle size may be identified using a particle size analyzer, a scanning electron microscope, or a transmission electron microscope. The average particle diameter may be represented by D50, for example.

In the present specification, unless otherwise defined, D50 refers to an average particle diameter of particles having a cumulative volume of 50 vol % in a particle distribution, and on a distribution curve obtained by accumulating particles from the smallest particle size to the largest particle size where the total number of the particles is assumed to be 100%, D50 refers to a value of a particle diameter at 50% counted from the smallest particle. Average particle diameter (D50) may be measured by any method widely known to a person skilled in the art, and for example, may be measured by a particle size analyzer (Example: HORIBA, LA-950 laser particle size analyzer) or may be measured from TEM photographs or SEM photographs. Alternatively, D50 can be measured using a measurement device using dynamic light-scattering, and by performing data analysis and counting the number of particles in each particle size range, D50 can be easily obtained through calculation therefrom.

According to an embodiment, the size of the metal particle is about 1 μm to about 100 μm, about 3 μm to about 95 μm, about 5 μm to about 90 μm, or about 10 μm to about 80 μm.

In the metal particle, the ratio of the thickness of the shell to the thickness of the core (the thickness of the shell/the thickness of the core) is about 0.05 to about 0.5, about 0.1 to about 0.5, or about 0.1 to about 0.2. When the metal particle has the above-described thickness ratios, it is possible to obtain an adhesive paste that is capable of low-temperature mounting without coagulation of metal particles, while having improved mechanical properties.

In the metal particle according to one embodiment, the core has a diameter of about 1 μm to about 100 μm, about 10 μm to about 100 μm, about 10 μm to about 90 μm, about 15 μm to about 50 μm, or about 15 μm to about 25 μm. In addition, the shell has a thickness of about 100 nm to about 20 μm, about 1 μm to about 10 μm, or about 5 μm to about 10 μm.

In the metal particle according to an embodiment, if the diameter of the core increases, the thickness of the shell may also increase in proportion thereto. For example, when using the core having a diameter of 100 μm, the shell may have a thickness in the range of about 10 μm to about 20 μm, and when using the core having a diameter of 25 μm, the shell may have a thickness in the range of about 2 μm to about 4 μm.

The presence of nanoparticles in the shell may be confirmed by SEM or TEM analysis, and the amount of metal forming the nanoparticles in the shell may be evaluated by EDS analysis.

An intermetallic compound (IMC) may be positioned between the metal material of the core and the metal material of the shell. When such an IMC is present, unlike alloys, metal atoms occupy a certain position within a unit lattice of crystal, and as a result, the metal particles may have high hardness and brittleness. Accordingly, the metal particle for adhesive paste according to an embodiment does not remelt even in a subsequent heat-treatment process at 400° C. or higher. At the same time, when using the metal particle for adhesive paste as a metal particle for solder paste, differences in properties, such as toughness and Poisson's ratio, between the metal particle for adhesive paste and the solder ball used may be reduced and or minimized.

The metal particle for adhesive paste according to an embodiment may be applied to a paste for use in bonding (printed) circuit boards and electronic components, and for example, may be applied to a paste for bonding semiconductor package, for example, a solder paste. The metal particle for adhesive paste is capable of mounting semiconductor devices on (printed) circuit boards at low temperature, and thus may reduce defects and performance decline caused by thermal damage to semiconductor modules.

According to another aspect, an adhesive paste including the above-described metal particle is provided. The adhesive paste may be, for example, a solder paste.

According to another aspect, provided is a composite bonding structure including: a solder ball; and a heat-treatment product of the above-described solder paste bonded to the solder ball.

As used herein, the term "a heat-treatment product of a solder paste" refers to a product obtained by heat-treating the solder paste through a reflow process.

The reflow process may yield metal particles having a core/shell structure containing a nanoparticle in the shell as solder particles as flux components, etc. contained in the solder paste are removed. The reflow process may involve a heat treatment at a temperature of, for example, about 150° C. to about 250° C., or about 180° C. to about 220° C.

The heat-treatment product of the solder paste includes the core of a metal particle, and a shell metal matrix formed as a metal of the shell is melted, and in the shell metal matrix, nanoparticles are uniformly dispersed or distributed. The shell metal matrix of the metal particle is formed as only the shell metal melts and surrounds the core at a reflow temperature that is lower than the melting point of the core.

When nanoparticles are dispersed in a high-viscosity state in a solder paste by a conventional method, a severe coagulation of nanoparticles occurs. However, in the solder paste according to an embodiment, since nanoparticles are evenly distributed in the shell metal matrix, coagulation of particles is limited and/or prevented even when the amount of the nanoparticles is increased.

FIG. 1A schematically shows a semiconductor device provided with a composite bonding structure according to an embodiment.

A semiconductor device 200 may include a printed circuit board 210, a semiconductor chip 230, and a composite bonding structure 100 attaching the printed circuit board 210 and the semiconductor chip 230 to each other.

The composite bonding structure 100 includes a solder ball 110 and a heat-treatment product 130 of a solder paste attached to the solder ball 110. Here, the heat-treatment product 130 of the solder paste refers to a product obtained after the reflow process of the solder paste, and as the solder paste undergoes the reflow process, flux components, etc. contained in the solder paste are removed, the solder paste contains metal particles in which a nanoparticle is included in the shell of a solder particle. For example, the reflow product may include a surfactant, and the like. Subsequent to the reflow process, the core/shell structure in the metal particle disappears.

The heat-treatment product is uniformly distributed in a joint between the solder ball 110 and the printed circuit board 210.

Figure 1B:
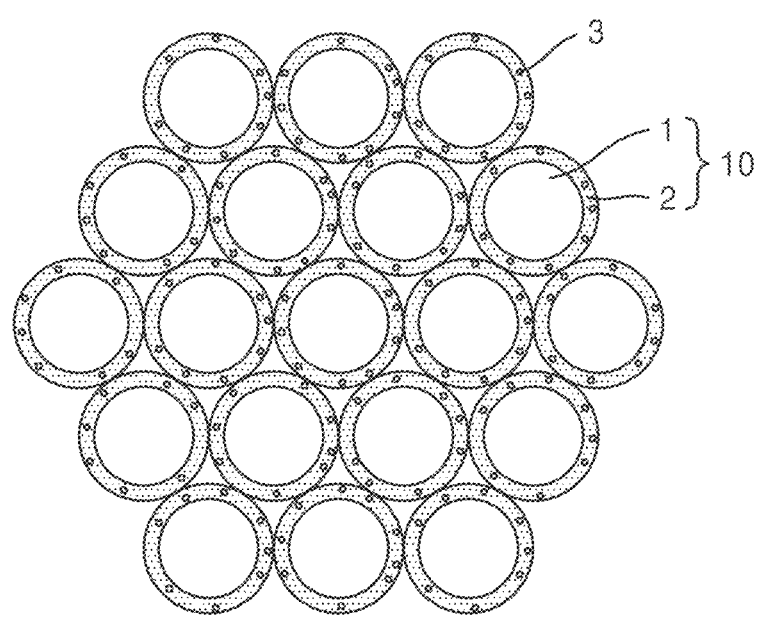
FIG. 1B shows a metal particle included in an adhesive paste prior to a reflow process of the adhesive paste according to an embodiment.

The metal particle according to an embodiment has a structure as shown in FIG. 1B.

The metal particle 10 contains a core 1 composed of a material having similar physical properties as the solder ball 110, and a shell 2 on at least one surface of the core 1. Here, the physical properties represent a crystal structure, Young's modulus, Poisson's ratio, and the like.

The shell 2 includes a metal having a relatively lower melting point than the core, and in a bonding process at a temperature within a range where the shell with a low melting point melts while the core does not melt, wetting can be easily carried out, and through the inter-diffusion of liquid, which is faster than solid, an intermetallic compound having a re-decomposition temperature higher than the bonding temperature is formed at a joint.

However, as crystal grains of a shell component with a low melting point that has low toughness become coarse or the intermetallic compound forms to be thick at the joint, mechanical properties may be degraded. However, according to an embodiment, the inclusion of nanoparticles 3 in the shell of the metal particle may limit and/or prevent in advance the above-described issues from arising.

Figure 2A:
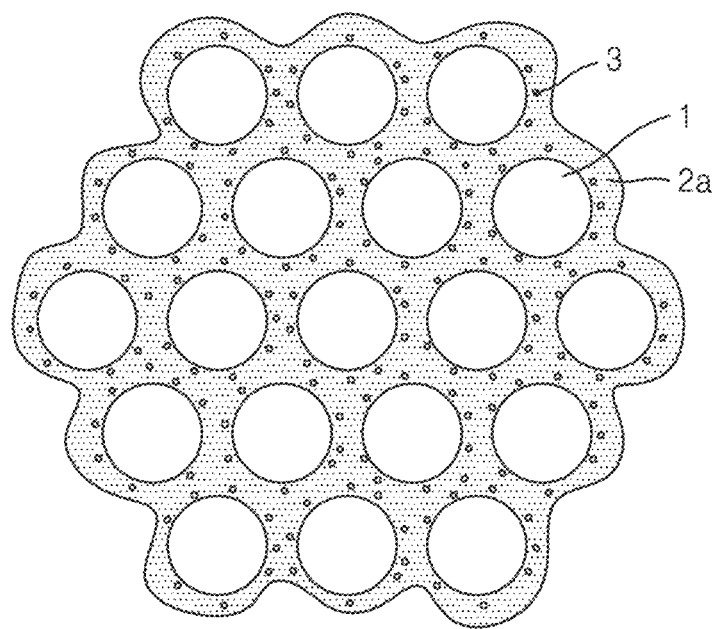
FIG. 2A shows the state of metal particles after a reflow process of an adhesive paste according to an embodiment.

The nanoparticles 3, as shown in FIG. 2A, are evenly distributed in a shell metal matrix 2a which is formed by melting of the shell. Here, the amount of the nanoparticles 3 is about 0.01 wt % to about 10 wt %, about 0.5 wt % to about 9 wt %, about 1 wt % to about 8 wt %, or about 3 wt % to about 5 wt % based on the total weight of shell.

In addition, in a TLP particle, which is a metal particle according to an embodiment, since the melting point of the core is higher than the melting point of the shell, only the shell material melts during the bonding process, and thus, in forming a core material and an intermetallic compound, the nanoparticles included in the shell, due to their inert characteristics, do not melt nor form an intermetallic compound, and as a result, are uniformly distributed within a melted shell metal matrix. Here, the intermetallic compound formed has a re-decomposition temperature of at least 400° C. or more, and thus does not remelt during a subsequent heat-treatment process.

By using a solder paste according to an embodiment, it is possible to reduce and/or minimize differences in physical properties with the solder ball and achieve the effect of enhancing mechanical properties by nanoceramic particles while reducing a melting point.

Figure 1C:
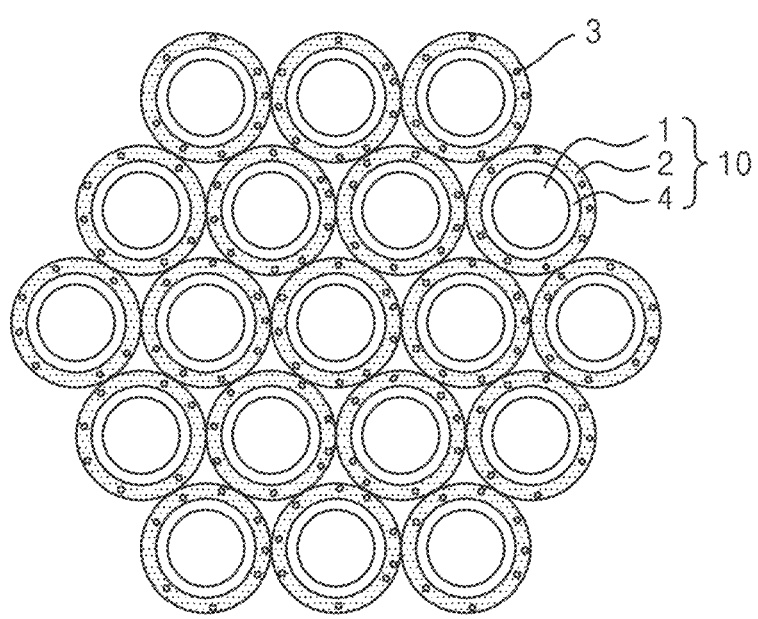
FIG. 1C shows another metal particle included in an adhesive paste prior to a reflow process of the adhesive paste according to some embodiments.

As shown in FIG. 1C, an intervening layer 4 may be further included between the core 1 and the shell 2. In some embodiments, the intervening layer 4 may be a barrier layer. In the process for bonding a semiconductor package to a printed circuit board, there may be diffusion occurring between the core 1 and the shell 2 layer. Here, the barrier layer 4 may reduce and/or minimize the possibility of voids, such as a diffusion layer, from being present.

The barrier layer 4 may include nickel.

In other embodiments, the intervening layer 4 may be an intermetallic compound positioned between the at least one metal of the core 1 and the at least one metal of the shell 2. In other embodiments, the intervening layer 4 may include both the barrier layer and the intermetallic compound.

The core 1 of the metal particle 10 includes tin, nickel, copper, gold, silver, germanium, antimony, aluminum, titanium, palladium, chromium, molybdenum, nickel, tungsten, zinc, or a combination thereof. In addition, the shell 12 of the metal particle 10 according to an embodiment includes tin, indium, gallium, silver, bismuth, zinc, or a combination thereof. Here, the combination may include an alloy, a solid solution, and an intermetallic compound of the metals mentioned, or a mixture thereof.

The amount of the core in the metal particle is about 50 wt % to about 90 wt % with respect to the total weight of the metal particle, and the amount of the shell is about 10 wt % to about 50 wt % with respect to the total weight of the metal particle.

The core in the metal particle according to an embodiment includes copper, and the shell may include indium, silver, or a combination thereof, and one or more selected from among $CeO_2$, $La_2O_3$, SiC, $ZrO_2$, $TiO_2$, $Y_2O_3$, and AlN.

The shell may be a monolayer structure or a multilayer structure. For example, the core 1 may be copper, and the shell 2 may be a monolayer structure where indium is coated on the core 1. For example, the core 1 may be copper, and the shell 2 may have a bilayer structure where indium and silver are successively coated on the core 1.

For example, the core may include an alloy of tin, silver, and copper, and the shell may be a monolayer or multilayer of tin, bismuth, or a combination thereof. For example, the core may be an alloy of tin, silver, and copper, or may be an alloy of tin, silver, and copper, with at least one metal selected from among nickel, cobalt, zinc, bismuth, and aluminum. For example, the core may include Sn-3.0Ag-0.5Cu, Sn-1.0Ag-0.5Cu, Sn-4.0Ag-0.5Cu, Sn-1.2Ag-0.5Cu-0.05Ni-0.01 Ge, or Sn-1.2Ag-0.5Cu-0.5Sb, and the like. However, the core is not limited thereto, and may also include alloys of tin, silver and copper of various compositions, or alloys of various compositions, of tin, silver, and copper, with at least one metal selected from among nickel, cobalt, zinc, bismuth, and aluminum.

For example, in the metal particle having a core-shell structure, the core may be Sn-3.0Ag-0.5Cu, and the shell may be a monolayer structure where bismuth is coated on the core. For example, in the metal particle having a core-shell structure, the core may be Sn-3.0Ag-0.5Cu, and the shell may be a bilayer structure where bismuth and Sn58Bi are successively coated on the core.

In FIG. 1A, a solder heat-treatment product 130 may further contain an additional solder particle as an auxiliary component. The additional solder particle may include, for example, at least one from among In, Zn, a SnBiAg alloy and a SnBi alloy.

The solder particle may include, for example, Sn58Bi. The solder particle may have, for example, a diameter in the range of about 20 μm to about 45 μm.

A solder ball 121 may include at least one alloy selected from the group consisting of Sn—Ag—Cu alloy, Sn—Bi alloy, Sn—Bi—Ag alloy, and Sn—Ag—Cu—Ni alloy. The solder ball 121, for example, may include at least one from among Sn—Ag(0.3-3)-Cu(0.1-1), Sn—Bi(35-75), Sn—Bi (35-75)-Ag(0.1-20), and Sn—Ag(0.5-5)-Cu(0.1-2)-Ni(0.05-0.1). For example, when the solder ball 121 is composed of Sn—Ag—Cu alloy, the solder ball 121 may include SAC305 (Sn-3.0Ag-0.5Cu) or SAC205(Sn-2.0Ag-0.5Cu), etc. The amount of each element constituting the solder ball is expressed in wt % or atom %.

For a flux, a material having excellent thermal degradability is used so that it can degrade during the bonding process and can limit and/or prevent oxidation of the metal particle. In addition, the flux serves to facilitate flowability of solder particles and interparticle reactions, facilitate a printing process, and improve fusion efficiency of the solder paste.

The amount of the flux is about 8 wt % to about 12 wt %, or about 9 wt % to about 11 wt %, with respect to the total weight of the metal particle and the flux. The flux may include, for example, a water-soluble flux or a lipid-soluble flux.

For the flux, any known flux composed of a vehicle, a solvent, a thixotropic agent, an active agent, and the like, may be used.

For the flux, examples of the vehicle include rosin-based resin, such as rosin and a derivative such as a modified rosin modified therefrom, a synthetic resin, or a mixture thereof, and the like. Specific examples of the rosin-based resin consisting of rosin and a derivative such as a modified rosin modified therefrom include wood rosin, polymerized rosin, hydrogenated rosin, formylated rosin, rosin esters, rosin-modified maleic acid resin, rosin-modified phenol resin, rosin-modified alkyd resin, various other rosin derivatives, and the like. In addition, specific examples of synthetic resin, which is composed of rosin and its derivative, such as modified rosin obtained by modification thereof and the like, include polyester resin, polyamide resin, phenoxy resin, terpene resin, and the like.

In addition, for the solvent, alcohols, ketones, esters, ethers, aromatic compounds, hydrocarbons, etc. are known, and specific examples of the solvent include benzyl alcohol, ethanol, isopropyl alcohol, butanol, diethylene glycol, ethylene glycol, ethyl cellosolve, butyl cellosolve, ethyl acetate, butyl acetate, butyl benzoate, diethyl adipate, dodecane, tetradecene, terpineol, toluene, xylene, propylene glycol monophenyl ether, diethylene glycol monohexyl ether, ethylene glycol monobutyl ether, diethylene glycol monobutyl ether, diisobutyl adipate, hexylene glycol, cyclohexanedimethanol, and a mixture thereof.

In addition, specific examples of the thixotropic agent may include hydrogenated castor oil, carnauba wax, amides, hydroxy fatty acids, dibenzylidene sorbitol, beeswax, stearic acid amides, hydroxystearic acid, ethylene bis amide, and the like.

In addition, the active agent may include halogenated hydracids of amine, organic halogen compounds, organic acids, organic amines, polyhydric alcohols, and the like.

Through a reflow process, the flux is vaporized and disappears, and thus is absent or barely remains in the heat-treatment product of the solder paste. For example, the solder ball 110 may include Sn-3 wt % Ag-0.5 wt % Cu (SAC305), and the metal particle may include $CeO_2$ as a nanoparticle in the shell.

Figure 2B:
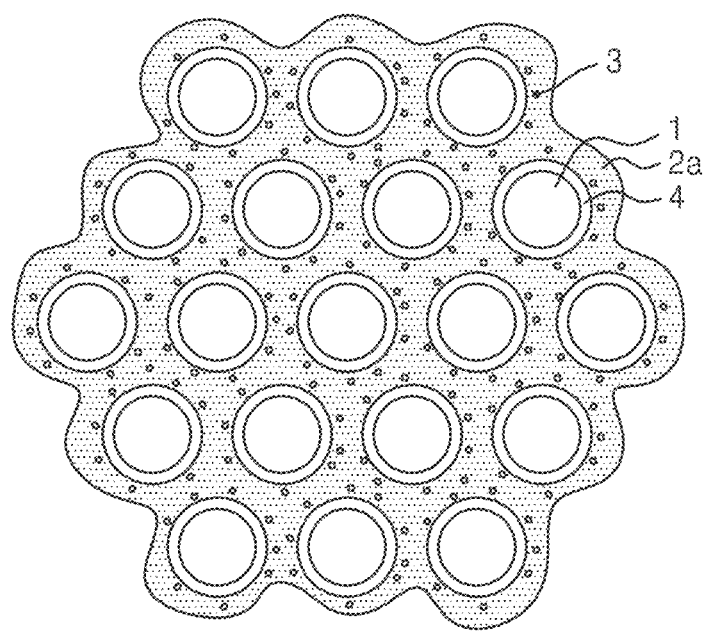
FIG. 2B shows the state of metal particles after a reflow process of an adhesive paste according to some embodiments.

FIG. 2B shows the state of metal particles after a reflow process of an adhesive paste according to some embodiments. As depicted in FIG. 2B, in some embodiments, an intervening layer 4 (e.g., barrier layer and/or intermetallic compound) may surround core 1 and may be positioned between the shell matrix 2a and core 1.

Hereinbelow, a method of preparing a metal particle for adhesive paste according to an embodiment is described in detail.

The metal particle for adhesive paste is prepared by preparing a mixture including a core-forming metal particle or metal precursor, and a shell-forming metal precursor; and obtaining a composition by adding nanoparticles to the mixture, and contacting this composition.

According to an embodiment, the mixture is a plating solution, and the contacting of the composition is carried out, for example, by electroplating or electroless plating using the above-described composition.

When adding the nanoparticles to the mixture, nanoparticles treated with ultrasonic dispersion may be used. Once treated with ultrasonic dispersion, the nanoparticles are uniformly distributed in the shell of the metal particle.

When performing the ultrasonic dispersion, a surfactant may be used to optimize dispersion of the nanoparticles. For the surfactant, an anionic surfactant, a cationic surfactant, or a combination thereof, may be used. Examples of the anionic surfactant may include sodium dodecyl sulfate and the like, and examples of the cationic surfactant may include cetyltrimethylammonium bromide and the like. The above-described surfactant may be present in a heat-treatment product of the solder paste.

The amount of the nanoparticles in the composition is controlled to be about 0.1 g/L to about 10 g/L, about 2.5 g/L to about 10.0 g/L, or about 2.5 g/L to about 5.0 g/L, with respect to the total amount of the composition. When the amount of the nanoparticles is within the above-described ranges, coagulation issues of nanoparticles may be improved, thus producing a metal particle in which the nanoparticles are evenly dispersed in the shell.

As described above, any of the electroplating and electroless plating methods may be used as a method for including nanoparticles in the shell of the metal particle according to an embodiment. However, depending on a number of variables in the electroplating and electroless plating methods, the amount and uniformity of nanoparticles may vary.

For example, in the electroplating method, factors such as current density, concentration of particles in a plating bath, temperature, plating time, stirring rate, current density, pH, surfactants, and dispersion methods such as ultrasonic treatment, may have an influence. In the electroless plating method, various amounts of nanoparticles can be uniformly included according to factors such as concentration of particles in a plating bath, temperature, plating time, the amount of a surfactant, the amount of a reducing agent, pH, a dispersion method, etc.

The metal particle for adhesive paste according to an embodiment is prepared by uniformly dispersing nanoparticles in a plating solution for forming a metal particle having a core/shell structure, and performing an electroplating or electroless plating method to thereby cause co-deposition of a shell-forming metal particle and nanoparticles in the shell.

The above-described electroplating or electroless plating process may adjust the amount of nanoparticles through factors such as current density, a reducing agent, pH, the concentration of particles in a bath, particle size, temperature, a stirring rate, etc. The current density in the plating process is adjusted, for example, to about 0.1 A/dm2 to about 5.0 A/dm2, or to about 0.1 A/dm2 to about 2.5 A/dm2.

As a reducing agent in the plating process, titanium chloride or the like, is used. In addition, trisodium citrate dihydrate, nitrilotriacetic acid, and the like, may be used as a stabilizer.

The composition of the plating solution for forming a metal particle having a core/shell structure varies depending on, for example, the metal forming the shell. In addition, the pH of the plating solution may be varied depending on a metal component forming the plating solution, and the like. The pH of the plating solution is adjusted to about 9 to about 11, for example, to 10, and carried out at about 60° C. to about 90° C.

As only the shell portion melts during an attachment process forming a joint, the nanoparticles uniformly distributed in the shell are evenly distributed therein, and thus through crystal grain refining, may improve mechanical properties of a solder paste and a heat-treatment product of the solder paste formed therefrom.

A composite bonding structure 100 may serve to electrically connect a semiconductor chip to a printed circuit board and the like.

The composite bonding structure according to an embodiment may be formed to have a shear stress strength of 500 gf or more, for example, about 500 gf to about 600 gf. The composite bonding structure may have a shear stress in the above-described range at boundaries between the solder ball and the heat-treatment product of the solder paste.

In addition, the composite bonding structure according to an embodiment may be formed so as to have a modulus of elasticity in the range of about 42.0 GPa to about 45.0 GPa at boundaries between the solder ball and the heat-treatment product of the solder paste.

The composite bonding structure according to an embodiment may be formed to have a Poisson's ratio in the range of about 0.31 to about 0.35 at boundaries between the solder ball and the heat-treatment product of the solder paste. As used in the present application, the Poisson's ratio represents a measure of deformation in the composite bonding structure when an external force is applied thereto.

The composite bonding structure according to an embodiment may be formed to have a coefficient of thermal expansion (CTE) in the range of about 14 μm/(mK) to about 40 μm/(mK) at boundaries between the solder ball and the heat-treatment product of the solder paste.

When there is a large difference in physical properties between the solder ball and the heat-treatment product of the solder paste, bonding strength at the boundaries between the solder ball and the heat-treatment product of the solder paste becomes weak and can easily break upon an external shock.

However, by adjusting at least one from among shear stress strength, elastic modulus, Poisson's ratio, and thermal expansion coefficient of the heat-treatment product of the solder paste and the solder ball, the composite bonding structure according to an embodiment may increase the bonding strength and improve toughness and brittleness.

The composite bonding structure according to an embodiment may be used, for example, as a low-temperature bonding material applied to data servers, laptops, mobile phones, TV, and the like.

Hereinbelow, a method of preparing a solder paste according to an embodiment is described in detail.

The solder paste may be prepared by mixing a metal particle for adhesive paste according to an embodiment, and a flux, in an organic solvent.

When preparing the solder paste, various additives that are usable may be further added.

FIG. 6 to FIG. 10 illustrate a method of preparing a semiconductor device according to an embodiment.

Figure 6:
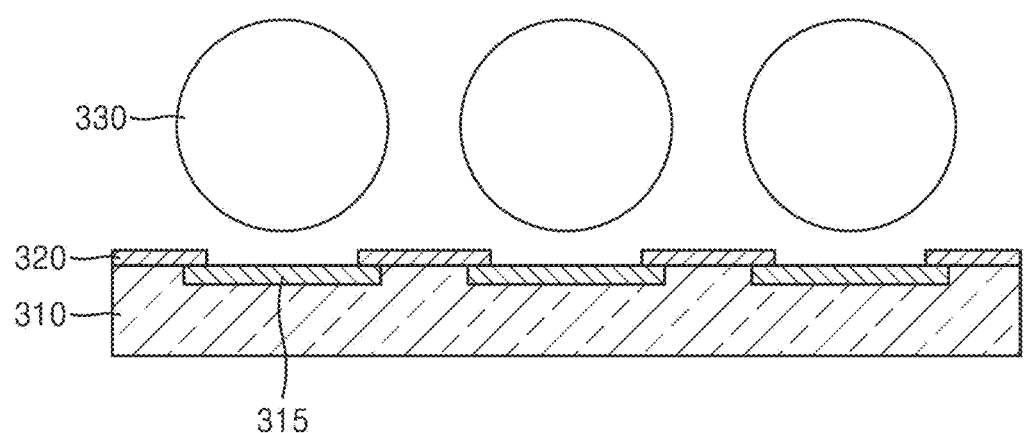
FIG. 6 to FIG. 10 illustrate a method of preparing a composite bonding structure according to an embodiment of the present disclosure.

Referring to FIG. 6, a metal pad 315 may be formed on a semiconductor chip 310, and a solder ball 330 may be arranged on the metal pad 315. The semiconductor chip 310 may include, for example, a memory chip. The semiconductor chip 310 may include, for example, DRAM or PRAM, etc. Reference numeral 320 represents a protective film.

Figure 7:
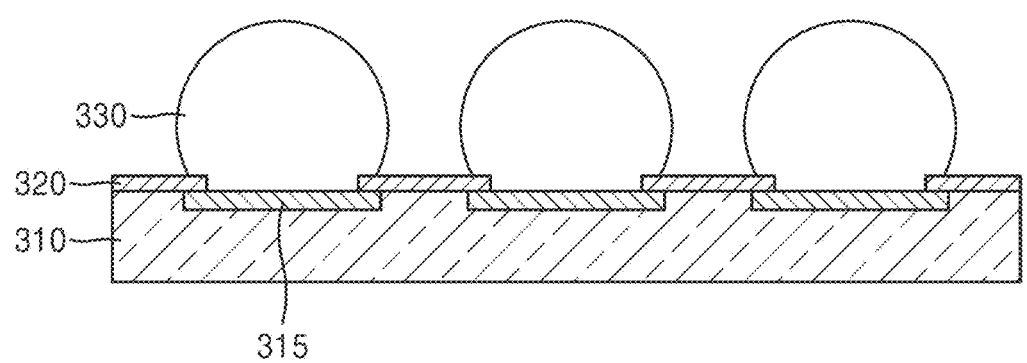

Referring to FIG. 7, the solder ball 330 may be attached to the metal pad 315. The solder ball 330 may include at least one alloy selected from the group consisting of an Sn—Ag—Cu alloy, an Sn—Bi alloy, an Sn—Bi—Ag alloy, and an Sn—Ag—Cu—Ni alloy.

Figure 8:
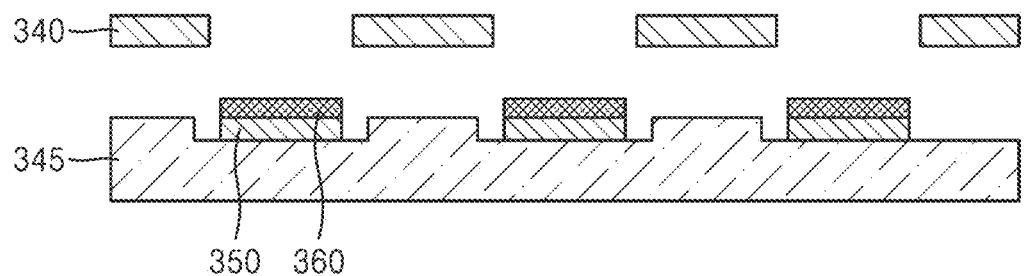

Referring to FIG. 8, a solder paste 360 according to an embodiment may be applied onto a printed circuit board 345 by using a mask 340. As the method of applying the solder paste 360, a stencil printing method may be used, for example. The printed circuit board 345 may include an electrode 350 together with a wiring necessary for supplying power, a thin-film-transistor (TFT), and the like. The electrode 350 may be formed of a portion of a metal wiring formed on the printed circuit board 345, or may be formed of a metal pad connected to a wiring.

Figure 9:
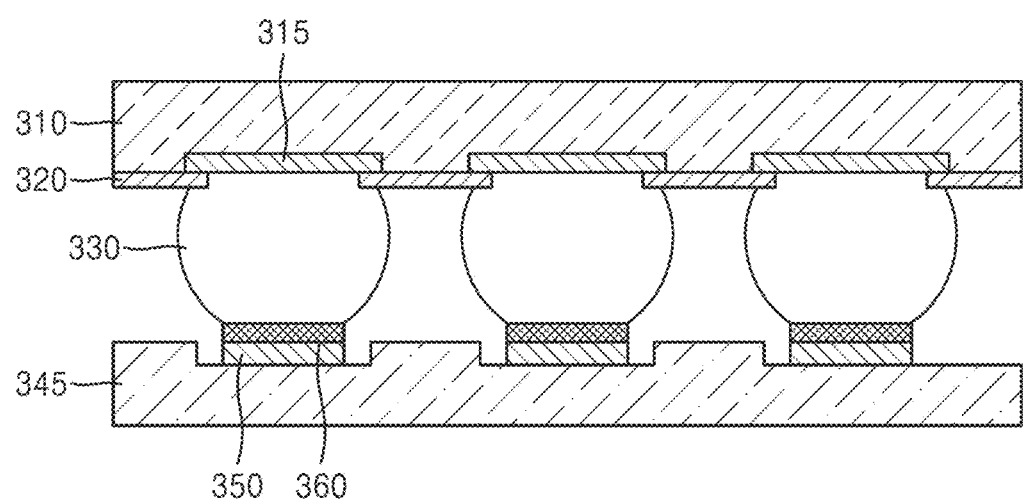
Figure 10:
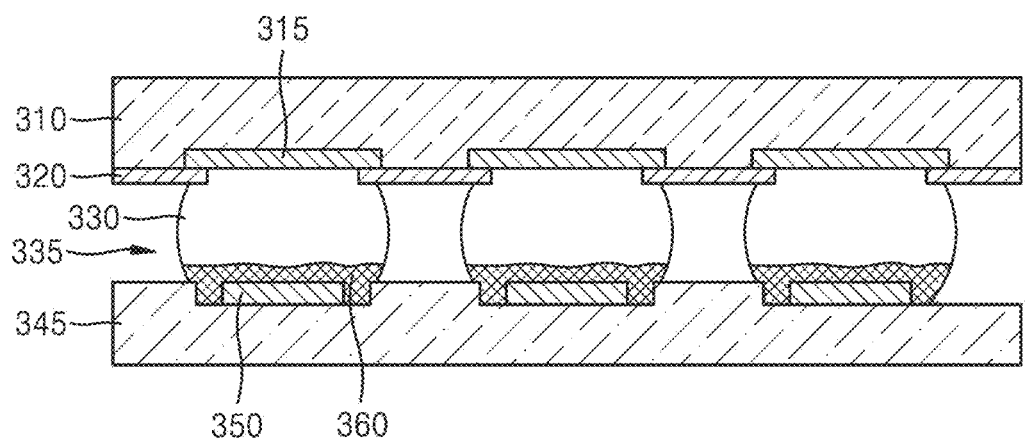

Referring to FIG. 9, the solder ball 330 in FIG. 8 may be placed to contact the solder paste 360 while facing the same. In addition, referring to FIG. 10, the solder paste 360 may be melted through a reflow process and bonded to the solder ball 330 to provide a composite bonding structure 335. The melting temperature of the solder paste 360 may be, for example, 150° C. or less. The melting temperature of the solder paste 360 may have a range of about 130° C. to about 150° C.

In the reflow process, the composite bonding structure may be cured during a cooling period.

Examples of a semiconductor device according to an embodiment may include an active element or a passive element. The semiconductor device may be mounted with a high level of integration on a single board. Here, a low-temperature bonding material is needed to reduce defects and performance decline caused by thermal damage in the semiconductor device. Such a low-temperature bonding material may be applied to semiconductor devices according to various examples. For example, the semiconductor device may include a memory semiconductor package or module used in a mobile laptop and a data server.

Further, the semiconductor device according to various examples may be applied to a flexible display, a wearable display, a foldable display, a stretchable display, and the like.

Hereinbelow, the present disclosure will be described in greater detail in conjunction with examples, but is not limited to the examples disclosed below.

Example 1

Copper (Cu) powder (average particle diameter: 90 μm); $InCl_3 \cdot 4H_2O$ (Sigma-Aldrich Co.), which is a metal salt; and trisodium citrate dehydrate and nitrilotriacetic acid, which are stabilizers, were mixed together and combined with $TiCl_3$ (HCl solution) (Kanto chemical Co., INC.) to prepare a plating solution. Using this plating solution, a reduction electroless plating was performed as follows.

A mixture containing nanoparticles $CeO_2$ (average particle diameter: 50 nm), deionized water as a solvent, and a surfactant, was dispersed using an ultrasonic device VCX500 (Sonic & Materials, Inc.) for 60 minutes at 750 W, a frequency of 20 kHz in a pulse mode to limit and/or prevent heating. The dispersed mixture was added to the plating solution. The amount of $CeO_2$ in the plating solution was 2.5 g/L. To the plating solution, an anionic surfactant, sodium dodecyl sulfate (SDS) was added.

By adding $NH_4OH$ to the plating solution, the plating solution was adjusted to pH 10, and then allowed to react for 80 minutes at 85° C. to prepare a metal particle for adhesive paste. In the shell of the metal particle thus prepared, the amount of $CeO_2$ was 2.3 wt % and the amount of indium was 97.7 wt % with respect to the total amount of the shell. Here, the amount of $CeO_2$ was measured by EDS analyses.

Example 2

A metal particle for adhesive paste was prepared by performing the same process described in Example 1, except the average particle diameter of nanoceramic particle $CeO_2$ was 500 nm instead of 50 nm, and the amount of $CeO_2$ in the plating solution was controlled to 5.0 g/L.

In the shell of the metal particle obtained from the above process, the amount of $CeO_2$ was 0.90 wt % and the amount of indium was 99.1 wt % with respect to the total amount of the shell.

Example 3

A metal particle for adhesive paste was prepared by performing the same process described in Example 2, except the amount of $CeO_2$ in the plating solution was controlled to 10.0 g/L.

In the shell of the metal particle obtained from the above process, the amount of $CeO_2$ was 4.3 wt % and the amount of indium was 95.7 wt % with respect to the total amount of the shell.

Reference Example 1

Copper (Cu) powder (average particle diameter: 90 μm); $InCl_3 \cdot 4H_2O$ (Sigma-Aldrich Co.), which is a metal salt; and trisodium citrate dehydrate and nitrilotriacetic acid, which are stabilizers, were mixed together and combined with $TiCl_3$ (HCl solution) (Kanto chemical Co., INC.) to prepare a plating solution, and a reduction electroless plating was performed using this plating solution.

The plating solution was adjusted to pH 10 by adding $NH_4OH$ thereto, and was allowed to react at 85° C. for 80 minutes, to prepare a metal particle.

Evaluation Example 1: SEM-EDS Analyses

Figure 3:
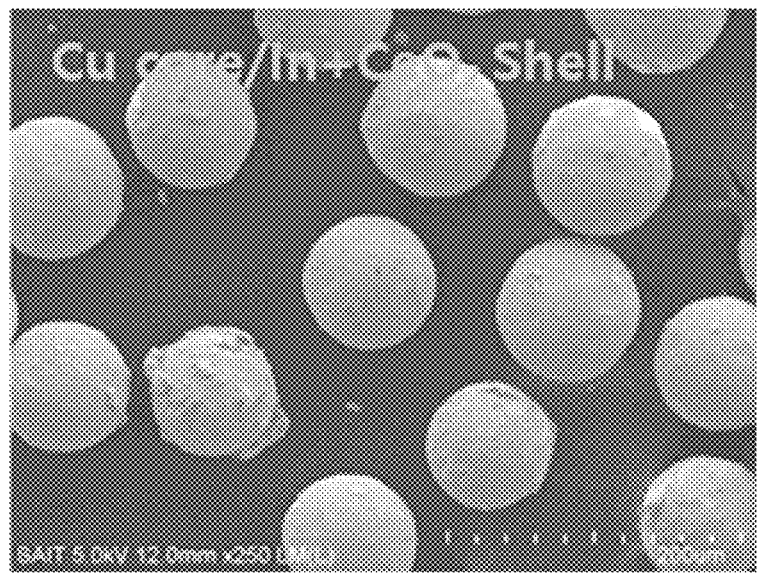
FIG. 3 is a scanning electron microscope photograph of metal particles for adhesive paste prepared in Example 1.
Figure 4A:
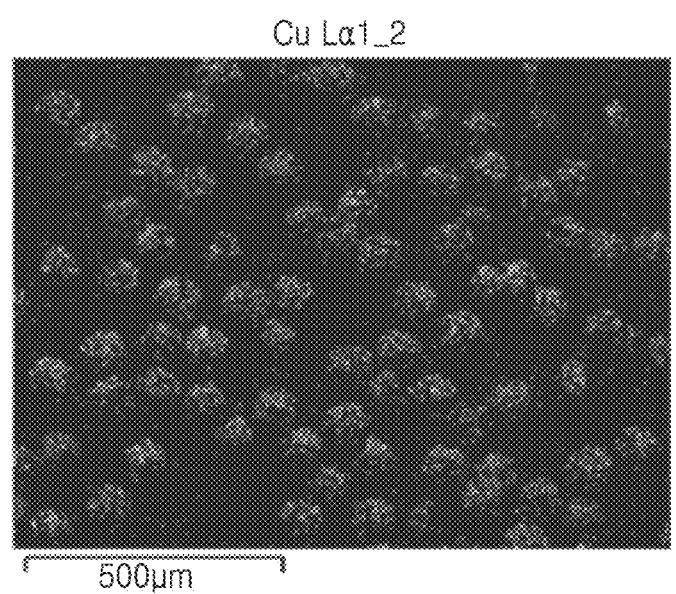
FIG. 4A to FIG. 4C show energy dispersive spectroscopy (EDS) mapping analysis results for metal particles for adhesive paste prepared in Example 1.
Figure 4B:
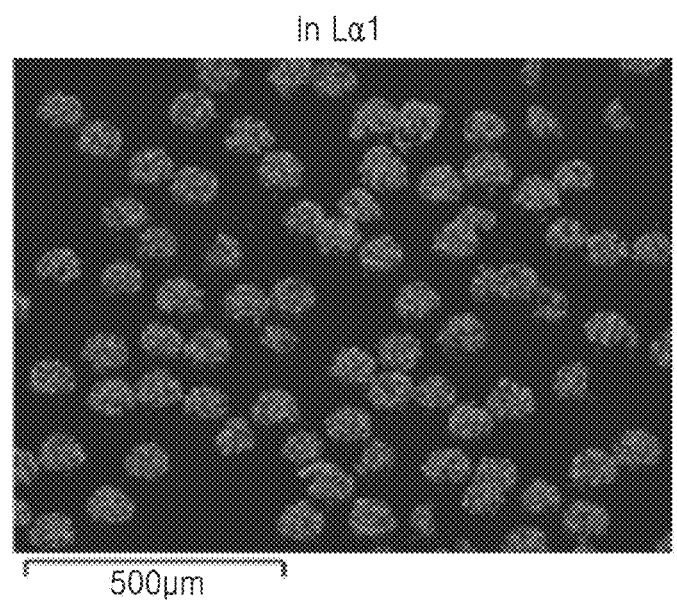
Figure 4C:
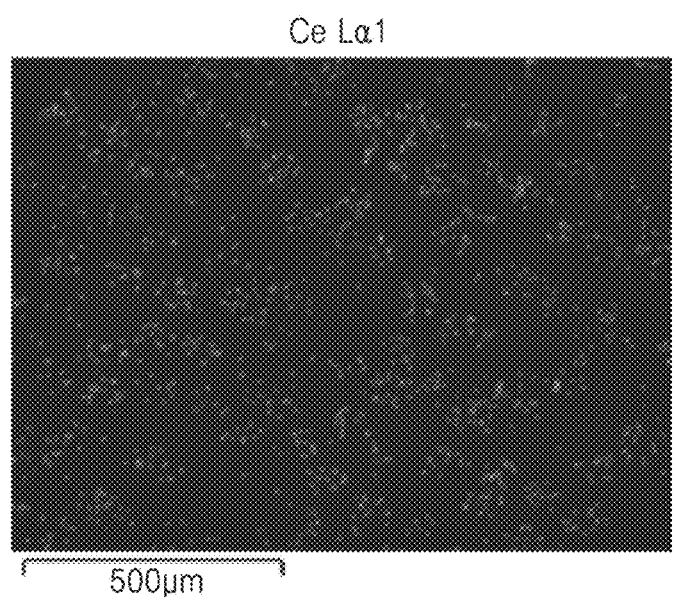

SEM-EDS analyses were performed on the metal particle prepared in Example 1. The results of SEM-EDS analyses are shown in FIG. 3 and FIG. 4A to FIG. 4C. FIG. 4A to FIG. 4C are the results of EDS analyses, showing copper, indium, and cerium mapping results, respectively. FIG. 3 is an SEM photograph of the metal particle in Example 1.

Referring to FIG. 4A to FIG. 4C, the metal compositions of a metal particle having a core/shell structure can be identified.

In addition, by EDS analyses on the metal particle prepared in Example 1, the amounts of metals that form the metal of the core, the metal of the shell, and the nanoparticles, were measured.

The result of measurement indicates that when the amount of indium was assumed to be 100, the relative amount of cerium was about 1.79 wt.

Evaluation Example 2: BST (Ball Shear Test)

A solder paste was prepared by mixing the metal particle prepared in Example 1 with a flux. The amount of $CeO_2$ nanoparticles included in the shell of the metal particle of Example 1 was 2.3 wt %, and the flux used was a water-soluble type. In addition, with respect to the total weight of the solder paste, the amount of the metal particle was 90 wt %, and the amount of the flux was 10 wt %.

To compare results with the solder paste containing the metal particle of Example 1, a solder paste was prepared by mixing the metal particle prepared in Reference Example 1 with $CeO_2$ nanoparticles and a flux. Here, with respect to the total weight of the solder paste, the amount of $CeO_2$ was 0.1 wt %, the amount of the metal particle of Example 1 was 90 wt %, and the amount of the flux was 10 wt %.

Using a mask, the solder paste prepared in the above process was applied onto a predetermined area of the board by a stencil printing method, and then, the board was disposed so as to bond to a printed circuit board with SAC305 solder ball mounted thereon, while facing each other. Subsequently, the resulting product was subject to a reflow process for heat-treating at about 190° C., causing the solder paste to melt and bond to the solder ball, thereby producing a structure.

An external force was applied to the structure, and the shear stress strength of the heat-treatment product of the solder paste was measured by measuring a bond strength of a soldering pad and a solder ball, by measuring the time for which the structure withstands the external force.

As a result of measuring the shear stress strength of the heat-treatment product of the solder paste, it was found that the shear stress strength of the heat-treatment product of the solder paste of Example 1 was about 500 gf, which was an increase compared to when the solder paste of Reference Example 1 (shear stress strength: 440 gf) was used. As shown above, such improvement in shear stress strength of the heat-treatment product of the solder paste of Example 1 was due to the fact that, unlike Reference Example 1, the metal particle included in the solder paste of Example 1 was uniformly distributed without particle coagulation.

Evaluation Example 3

To identify the dispersibility of nanoparticles, an electroplating method was performed as follows, using a copper foil, not copper powder.

HoplaLowsol indium concentrate (170 mL) and a plating additive, HoplaLowsol IN-11 (50 mL) manufactured by Hojinplatech Co., Ltd. were mixed in 780 mL of DI water, and the pH was adjusted to between pH 1.0 to pH 2.0 by using NaOH, and a current density was adjusted to 1.0 ASD (A/dm2) over 1 hour at 40° C., to prepare a sample.

In metal was used as a cathode and 20 μm Cu foil was used as an anode, and as was in the electroplating process, $CeO_2$ particles (average diameter: 50 nm) were ultrasonically dispersed prior to use.

Figure 5A:
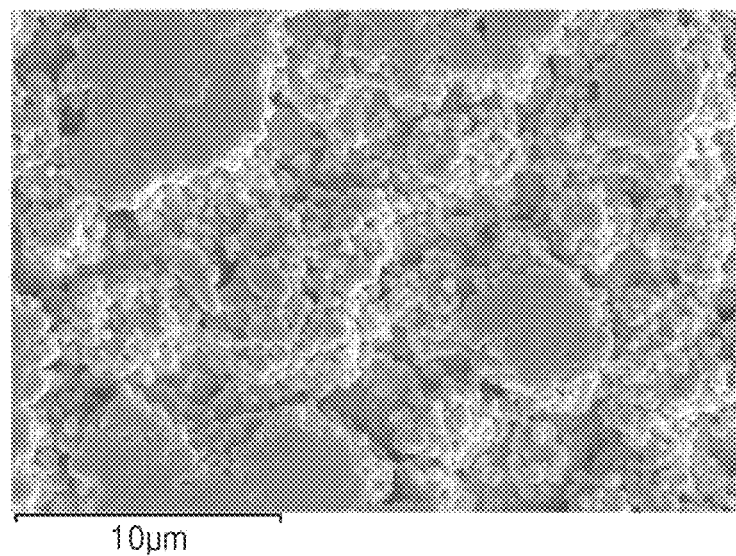
FIG. 5A and FIG. 5B are SEM-EDS photographs of metal particles obtained using a plating solution containing Sample 1 in Table 1 below.
Figure 5B:
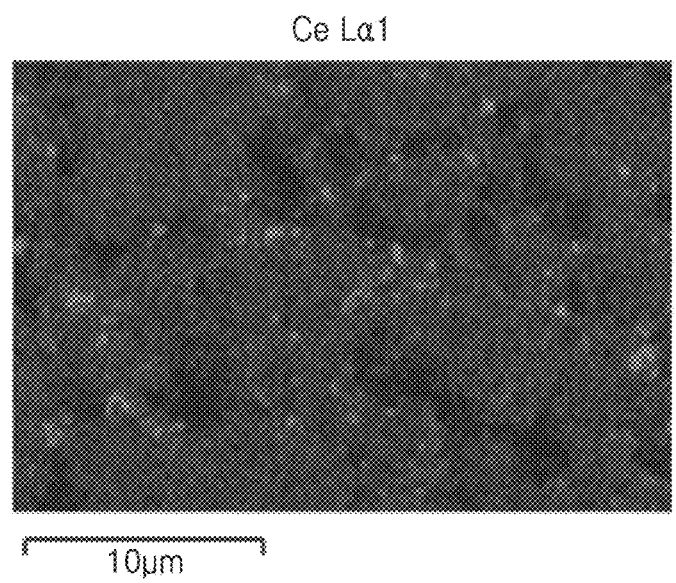
Figure 5C:
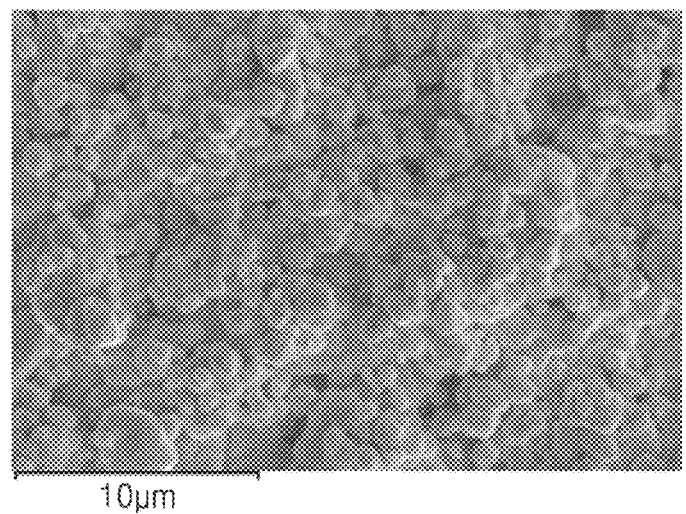
FIG. 5C and FIG. 5D are SEM-EDS photographs of metal particles obtained using a plating solution containing Sample 3 in Table 1 below.
Figure 5D:
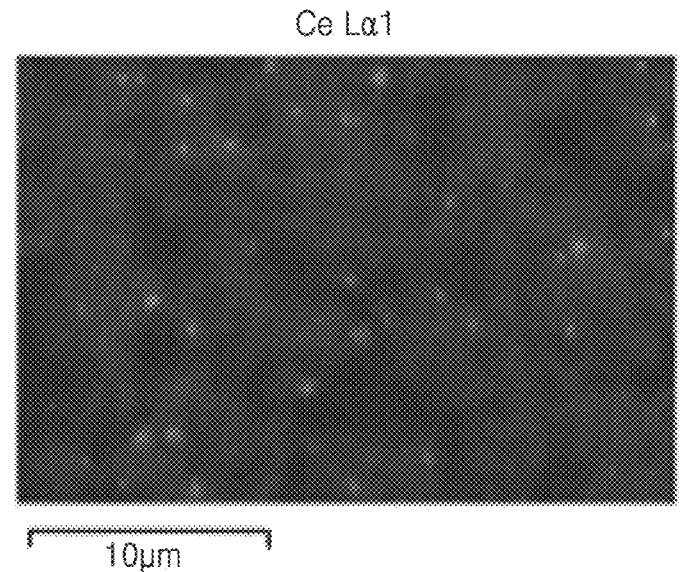
Figure 5E:
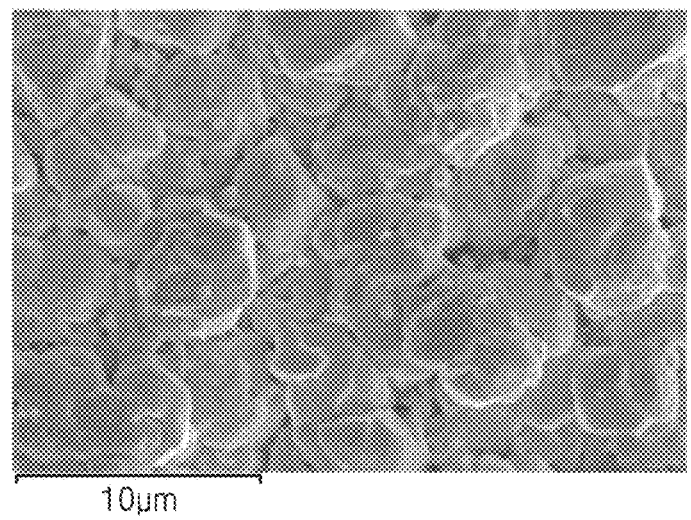
FIG. 5E and FIG. 5F are SEM-EDS photographs of metal particles obtained using a plating solution containing Sample 2 in Table 1 below.
Figure 5F:
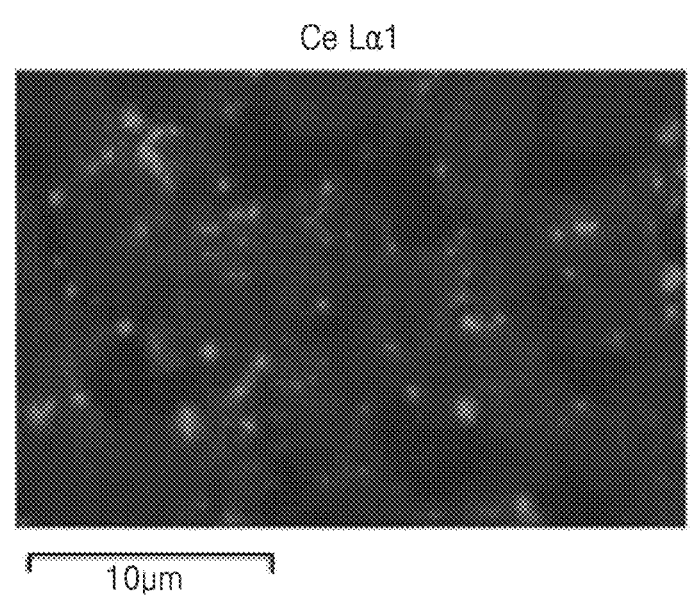

SEM-EDS analyses were performed on the sample, and the results thereof are shown in FIG. 5A to FIG. 5F. In detail, FIG. 5A and FIG. 5B are SEM-EDS photographs of metal particles obtained using a plating solution containing Sample 1 in Table 1 below. In addition, FIG. 5C and FIG. 5D are SEM-EDS photographs of metal particles obtained using a plating solution containing Sample 3 in Table 1 below, and FIG. 5E and FIG. 5F are SEM-EDS photographs of metal particles using a plating solution containing Sample 2 in Table 1 below. In Table 1 below, Samples 1 to 3 may correspond to the analysis results of the metal particles of Examples 1 to 3.

TABLE 1

| Item | Average diameter of $CeO_2$ (nm) | Amount of $CeO_2$ in plating solution (g/L) | Amount of $CeO_2$ in metal particle (vs. the total weight of the shell) |
| --- | --- | --- | --- |
| Sample 1 | 50 | 2.5 | 2.3 |
| Sample 2 | 500 | 10.0 | 0.9 |
| Sample 3 | 500 | 5.0 | 4.3 |

Referring to the foregoing, it was found that according to Sample 1, the nanoparticles having an average diameter of 50 nm are easier to disperse and the amount of particles is higher. As semiconductor circuit boards are becoming increasingly thinner and smaller, $CeO_2$ having an average diameter of 50 nm is more suitable for the nanoparticles.

The metal particle for adhesive paste according to one aspect may increase the amount of nanoparticles included in the shell and has a structure in which the nanoparticles are uniformly distributed in the shell. By using the metal particle described above, a solder paste capable of low-temperature mounting and having reduced nanoparticle coagulation may be obtained. By using the solder paste described above, it is possible to provide a composite bonding structure having reduced solder joint defects and a semiconductor device having improved reliability.

Figure 11:
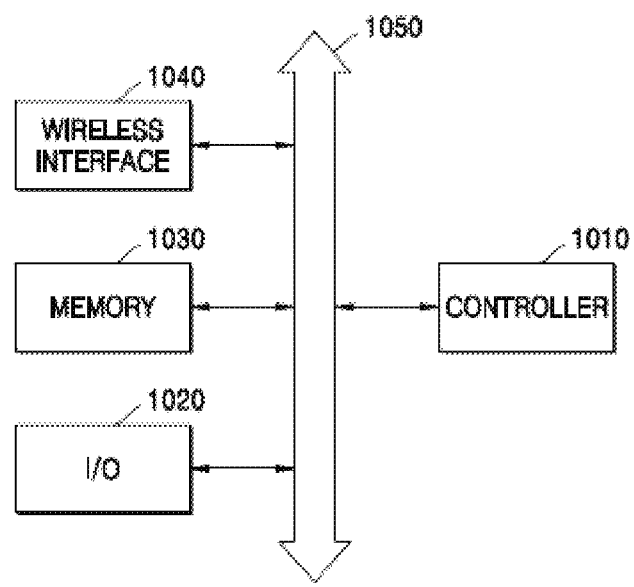
FIG. 11 is a block diagram of an electronic apparatus according to an example embodiment.

FIG. 11 is a block diagram of an electronic apparatus 1000 according to an example embodiment.

The electronic apparatus 1000 may be a wireless communication device, or a device capable of transmitting and/or receiving information in a wireless environment. The electronic apparatus 1000 includes a controller (1010, an input/output (I/O) device 1020, a memory (1030, and a wireless interface (1040, which are interconnected through a bus 1050.

The controller 1010 may include at least one of a microprocessor, a digital signal processor, or a processing device similar thereto. The I/O device 1020 may include at least one of a keypad, a keyboard, or a display. The memory 1030 may be used to store commands executed by the controller 1010. For example, the memory 1030 may be used to store user data. The electronic apparatus 1000 may use the wireless interface 1040 to transmit/receive data through a wireless communication network. The wireless interface 1040 may include an antenna and/or a wireless transceiver. The electronic apparatus 1000—in for example the memory 1030 and/or controller 1010—may include a semiconductor device prepared by the method of FIGS. 6 to 10 and/or the semiconductor 200 device described in FIG. 1A.

As used in the present specification, an element described as being on an "upper portion" of, or "on" another element includes the element that is disposed above the other element without making contact with the other element, as well as the element disposed immediately on top of the other element while in contact with the same.

The use of singular includes the plural, unless specifically stated otherwise. Also, when one element is described as "comprising," and/or "including" another element, this does not preclude the presence or addition of one or more other elements, unless otherwise indicated.

As used herein, the term "combination", unless otherwise indicated, includes mixtures, alloys, intermetallic compounds, or reaction products, and the like.

As used herein, the term "or" means "and/or" unless otherwise stated. As used throughout the present specification, in "one example", "example", and the like, the specific features disclosed therein are included in at least one example disclosed in the present specification, and may or may not be present in another example. Further, it should be understood that the elements disclosed herein may be used in combination in various examples. Unless otherwise defined, all technical and scientific terms used herein have the same meaning as commonly understood by one of ordinary skill in the art to which the present application belongs. All patents, patent applications, and other reference documents mentioned herein are incorporated by reference in their entirety.

However, if there is a disagreement between the terms used in the disclosure incorporated by reference and the terms used in the present specification, the terms in the present specification control. While specific examples and are described herein, there may be alternatives, modifications, variations, improvements, and substantial equivalents of the examples disclosed herein, including those that are not presently unforeseen or unappreciated, may arise from applicants or those skilled in the art. Accordingly, the appended claims as originally presented and as they may be amended, are intended to embrace all such alternatives, modifications, improvements and substantial equivalents.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of inventive concepts as defined by the following claims.

What is claimed is:

1. A metal particle for adhesive paste, the metal particle comprising:
    a core including at least one metal;
    and a shell on a surface of the core, the shell comprising at least one metal and nanoparticles,
    wherein the metal particle is a transient liquid phase particle, and
    the at least one metal of the core has a higher melting point than a melting point of the at least one metal of the shell.

2. The metal particle for adhesive paste of claim 1, wherein the nanoparticles include at least one of metal oxides, metal nitrides, semimetal nitrides, metal carbides, graphene, and carbon nanotubes.

3. The metal particle for adhesive paste of claim 1, wherein an amount of the nanoparticles is 0.01 wt % to 10 wt % with respect to a total weight of the shell.

4. The metal particle for adhesive paste of claim 1, wherein the nanoparticles each have a size of 1 nm to 1,000 nm.

5. The metal particle for adhesive paste of claim 1, wherein the nanoparticles include at least one of $La_2O_3$, $CeO_2$, SiC, $ZrO_2$, $TiO_2$, $Y_2O_3$, and AlN.

6. The metal particle for adhesive paste of claim 1, wherein the nanoparticles are present at a grain boundary of the at least one metal of the shell.

7. The metal particle for adhesive paste of claim 1, wherein
    the core has a diameter of 1 μm to 100 μm,
    the shell has a thickness of 100 nm to 20 μm, and
    a ratio of a thickness of the shell to a thickness of the core in the metal particle is 0.05 to 0.5.

8. The metal particle for adhesive paste of claim 1, wherein the core comprises one of tin, copper, gold, silver, germanium, antimony, aluminum, titanium, palladium, chromium, molybdenum, nickel, tungsten, zinc, or a combination thereof.

9. The metal particle for adhesive paste of claim 1, wherein the shell comprises one of tin, indium, gallium, silver, bismuth, zinc, or a combination thereof.

10. The metal particle for adhesive paste of claim 1, wherein
    the at least one metal of the core comprises copper, and
    the at least one metal of the shell comprises one of indium, silver, or a combination thereof, and
    the nanoparticles in the shell comprise one or more of $CeO_2$, $La_2O_3$, SiC, $ZrO_2$, $TiO_2$, $Y_2O_3$, and AlN.

11. The metal particle for adhesive paste of claim 1, further comprising:
    an intermetallic compound (IMC) between the at least one metal of the core and the at least one metal of the shell.

12. A solder paste comprising:
    the metal particle for adhesive paste according to claim 1.

13. A composite bonding structure comprising: a solder ball; and
    a heat-treatment product of the solder paste of claim 12 attached to the solder ball.

14. The composite bonding structure of claim 13, wherein
    the heat-treatment product of the solder paste comprises the core of the metal particle, and a shell metal matrix formed by melting the at least one metal of the shell of the metal particle,
    wherein the nanoparticles are uniformly dispersed or distributed in the shell metal matrix.

15. The composite bonding structure of claim 13, wherein the solder ball comprises at least one of an Sn—Ag—Cu alloy, an Sn—Bi alloy, an Sn—Bi—Ag alloy, and an Sn—Ag—Cu—Ni alloy.

16. The composite bonding structure of claim 13, wherein the heat-treatment product of the solder paste is obtained by a reflow process of the solder paste at a temperature of 180° C. to 220° C.

17. A semiconductor device, comprising:
    a printed circuit board;
    a semiconductor chip; and
    the composite bonding structure according to claim 13 between the printed circuit board and the semiconductor chip.

18. A method of preparing a metal particle for adhesive paste, the method comprising:
    preparing a mixture containing a core-forming metal particle or a core-forming metal precursor, and a shell-forming metal precursor; and
    obtaining a composition by adding nanoparticles to the mixture, and contacting the composition, wherein
    a melting point of a metal in the shell-forming metal precursor is lower than a melting point of the core-forming metal particle or a metal in the core-forming metal precursor, and
    the nanoparticles include at least one of metal oxides, metal nitrides, semimetal nitrides, metal carbides, graphene, and carbon nanotubes.

19. The method of claim 18, wherein
    the mixture is a plating solution, and
    the contacting of the composition is performed by electroplating or electroless plating using the composition.

20. The method of claim 18, wherein the nanoparticles are ultrasonically dispersed.

21. A composite structure, comprising:
    at least one core structure, the at least one core structure including at least one metal; and
    at least one shell structure surrounding the at least one core structure, the at least one shell structure including a metal material and nanoparticles distributed in the metal material, wherein
    a melting point of the at least one metal is greater than a melting point of the metal material in the at least one shell structure.

22. The composite structure of claim 21, wherein
    the at least one core structure is a plurality of core structures spaced apart from each other,
    the at least one shell structure is a plurality of shells,
    each corresponding shell surrounds a corresponding core structure among the plurality of core structures, the plurality of shells are connected to each other, and
the nanoparticles are distributed in each of the plurality of shells.

23. The composite structure of claim 21, wherein
the at least one core structure is a plurality of core structures spaced apart from each other, and
the at least one shell structure is a shell matrix surrounding the plurality of core structures and extending between adjacent core structures among the plurality of core structures.

24. The composite structure of claim 21, wherein
the nanoparticles include at least one of metal oxides, metal nitrides, semimetal nitrides, metal carbides, graphene, and carbon nanotubes, and
the nanoparticles have a size of 1 nm to 1,000 nm.

25. The composite structure of claim 21, wherein
the nanoparticles include at least one of $La_2O_3$, $CeO_2$, SiC, $ZrO_2$, $TiO_2$, $Y_2O_3$, and AlN,
the at least one metal includes one of tin, copper, gold, silver, germanium, antimony, aluminum, titanium, palladium, chromium, molybdenum, nickel, tungsten, zinc, or a combination thereof, and
the metal material includes one of tin, indium, gallium, silver, bismuth, zinc, or a combination thereof.

* * * * *